(12) United States Patent
Allen et al.

(10) Patent No.: US 6,309,619 B1
(45) Date of Patent: Oct. 30, 2001

(54) SOLID STATE SYNTHESIS OF POLY (DICHLOROPHOSPHAZENE)

(75) Inventors: Christopher W. Allen, Essex Junction; Azzam S. Hneihen, Burlington, both of VT (US); Eric S. Peterson, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/353,194

(22) Filed: Jul. 14, 1999

Related U.S. Application Data

(60) Provisional application No. 60/092,836, filed on Jul. 14, 1998.

(51) Int. Cl.$^7$ .................................................. C01B 25/10
(52) U.S. Cl. ........................................... 423/300; 528/168
(58) Field of Search .............................. 423/300; 528/168

(56) References Cited

U.S. PATENT DOCUMENTS

| 4,377,558 | * | 3/1983 | De Jaeger et al. | 423/300 |
| 4,544,536 | * | 10/1985 | De Jaeger et al. | 423/300 |
| 5,869,016 | * | 2/1999 | Andrianov et al. | 423/300 |

FOREIGN PATENT DOCUMENTS

| 981212 | * | 12/1982 | (RU) | 423/300 |

* cited by examiner

*Primary Examiner*—Wayne Langel
(74) *Attorney, Agent, or Firm*—Thorpe North & Western

(57) ABSTRACT

A method for making poly(dichlorophazene) using solid state reactants is disclosed and described. The present invention improves upon previous methods by removing the need for chlorinated hydrocarbon solvents, eliminating complicated equipment and simplifying the overall process by providing a "single pot" two step reaction sequence. This may be accomplished by the condensation reaction of raw materials in the melt phase of the reactants and in the absence of an environmentally damaging solvent.

12 Claims, No Drawings

SOLID STATE SYNTHESIS OF POLY (DICHLOROPHOSPHAZENE)

RELATED APPLICATION

This application claims priority from provisional application Ser. No. 60/092,836 filed on Jul. 14, 1998.

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

FIELD OF THE INVENTION

The present invention is drawn toward an improvement in condensation polymerization methods for making poly (dichlorophosphazene). More particularly, the present invention improves upon previous methods by removing the need for chlorinated hydrocarbon solvents, eliminating complicated equipment and simplifying the overall process by providing a "single pot" two step reaction sequence. Specifically, the condensation reaction occurs in the melt phase of the reactants in the absence of a solvent. As such, the practitioner may more carefully control the reaction resulting in greater molecular weight control, polydispersity control, reduced cost, and reduced environmental impact.

BACKGROUND OF THE INVENTION

Phosphazene polymers are valuable structures in several industries including environmental cleanup, mineral processing and potentially in industries such as dentistry, the aerospace industry and the military to name a few. As a specific example of use, phosphazene polymers can be made into semipermeable polymer inorganic membranes which are useful in the separation of desired components from fluid mixtures, e.g., U.S. Pat. No. 4,749,489. In fact, polyphosphazene membranes are more versatile than corresponding organic polymers used for similar purposes. Specifically, polyphosphazene membranes may be used at high temperature as well as in caustic and acidic environments. These characteristics are valuable in many areas including petrochemical separations, mineral processing, catalytic reactions and environmental cleanup. Conversely, organic membranes only remain stable in conditions of up to about 90° C. and in relatively benign environments.

As a second example illustrating the use of polyphosphazenes, there is promise in the area of dental surface protection. Research has been conducted indicating that polyphosphazenes may be effective in the protection of dental surfaces from acidic attacks causing demineralization, and that as denture liners they offer many advantages. These and other examples of the use of polyphosphazenes illustrate that these polymers are a valuable asset to several industries.

Polyphosphazenes are a broad and well known class of macromolecules that come in various forms. The linear polymer is essentially phosphorus and nitrogen joined by alternating single and double covalent bonds with additional groups also covalently bonded to the phosphorus. A representation of this polymer is as follows:

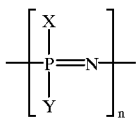

In the above structure, n may be a positive integer from 3 to $10^8$ and X and Y may or may not be the same substituent. For example, if the polymer were poly (dichlorophosphazene), then X and Y would both be chlorine. However, X and/or Y may include other substituents such as various organic compounds.

Linear, high polymeric phosphazenes, as represented above, are a class of inorganic polymers which have received extensive study at fundamental and applied levels. Specifically, even though poly(dichlorophosphazene) is a hydrolytically unstable elastomer, it can be converted to a wide range of derivatives by macromolecular nucleophilic substitution reactions with a broad variety of nucleophiles. For example, these polymers are often used in the synthesis of poly(organophosphazenes) through substitution reactions of the parent polymer as shown generally below:

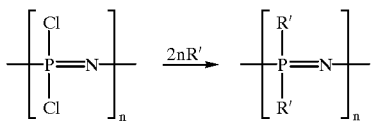

As shown in the above formula, poly (organophosphazenes) are generally prepared by reacting R', which may be one or more organic or organometallic nucleophiles, with poly (dichlorophosphazene). See, for example, Allcock, H. R.; Austin, P. E.; Neenan, T. X.; Sisko, J. T.; Blonsky, P. M.; Shriver, D. F. Macromol., 1986, 19, 1508, and Blonsky, P. M.; Shriver, D. F.; Austin, P. E.; Allcock, H. R. J. Am. Chem. Soc. 1984, 106, 6854. As such, poly(dichlorophosphazene) is an important compound for the synthesis of most other phosphazene polymers.

Several methods have been developed to prepare poly (dichlorophosphazenes). Many of these approaches have been developed and mentioned in the literature. However, two methods are the most common as they are the more commercially viable options. The first method is the thermal ring opening polymerization approach. Specifically, a hexachlorocyclotriphosphazene ring ($N_3P_3Cl_6$) is opened as is shown below:

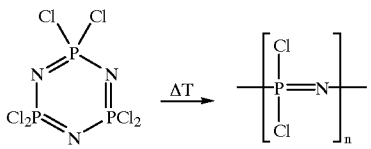

In the above formula, the representative equation is balanced when n is 3, but based upon multiple molecules of hexachlorocyclotriphosphazene, n may be from about 3 to $10^8$.

U.S. Pat. No. 4,110,421, discloses a ring opening technique where a sole starting material such as hexachlorocyclotriphosphazene is opened and polymerized in what is described as essentially a melt polymerization technique. This process takes from 5 to 400 hours at from 140 to 250°

C. This approach offers some advantages including the simplicity of handling of raw materials. However, there are some facets to this approach which make it less desirable. Those include undesirable waste products expensive and, tedious synthesis and purification of the starting material (hexachlorocyclotriphosphazene), longer periods of time to carry out the reaction, branching, product polydispersity and bimodal molecular weight distributions.

The second commercially viable method is a condensation polymerization approach as shown below:

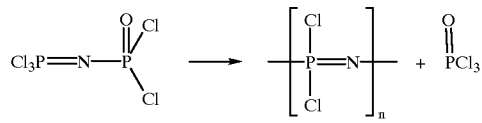

In the above formula, n may be from about 2 to $10^8$. In the condensation polymerization approach, there are some advantages over the ring opening approach. For example, greater molecular weight and polydispersity control are achieved. However, problems including bimodal product molecular weight distributions and relatively low final product molecular weights and use of halogenated hydrocarbons are also realized.

Based upon these known reactions and accompanying drawbacks, it would be useful to provide a method of preparing phosphazene polymers having a lower product polydispersity, tighter molecular weight controls, shorter reaction times, excellent yield and industrially valuable side products and reduction or elimination of the halogenated hydrocarbon solvents. This may be accomplished by the solid state, single pot, two phase reaction of the present invention which produces poly(dichlorophosphazene). The poly(dichlorophosphazene) may subsequently be reacted with other constituents to form desired polyphosphazenes as is known in the art.

OBJECTS AND SUMMARY OF THE INVENTION

It is an object of the present invention to provide a method of preparing a poly(dichlorophosphazene) by a condensation reaction method that is an improvement over other condensation reactions known in the art.

It is another object of the present invention to provide a method of preparing a poly(dichlorophosphazene) by utilizing a two step "single pot" reaction.

It is still another object of the present invention to provide a method of preparing a poly(dichlorophosphazene) by admixing raw materials in the melt phase, i.e., without the presence of a halogenated hydrocarbon solvent.

Yet another object of the present invention is to provide a method of preparing a poly(dichlorophosphazene) at a significantly greater rate than by traditional solution phased methods.

It is another object of the present invention to provide a method of preparing a poly(dichlorophosphazene) at a lower cost than ring opening and other condensation methods by elimination of complicated equipment simplification of the overall process, and elimination of environmentally harmful halogenated hydrocarbon solvents.

It is still another object of the present invention to provide a method of preparing a poly(dichlorophosphazene) that exhibits lower polydispersity, enables greater control over polydispersity, reduces bimodal molecular weight distributions as well as an increased control of molecular weight.

Yet another object of the present invention is to provide a simple and inexpensive method of preparing poly (dichlorophosphazene) which can be used in subsequent reactions to make other poly(phosphazenes) such as poly (organophosphazenes).

These and other objects may be accomplished by: 1) combining ammonium sulfate (($NH_4)_2SO_4$) with phosphorus pentachloride ($PCl_5$) in a reaction container; 2) heating the combined ammonium sulfate (($NH_4)_2SO_4$) and the phosphorus pentachloride ($PCl_5$) until a liquid monomer of P-trichloro-N-(dichlorophosphoryl)monophosphazene ($Cl_3P=NP(O)Cl_2$) is formed; and 3) bulk polymerizing the P-trichloro-N-(dichlorophosphoryl)monophosphazene ($Cl_3P=NP(O)Cl_2$) liquid monomer by heating under an inert atmosphere until an oxyphosphoryl chloride is distilled off forming a polydichlorophosphazene ($[Cl_2P=N]_n$) in the container. In this method, the molar ratio of ammonium sulfate (($NH_4)_2SO_4$) to phosphorus pentachloride ($PCl_5$) is preferably about 2:9.

DETAILED DESCRIPTION OF THE INVENTION

Before the present invention comprising a method of preparing poly(dichlorophosphazene) from solid state synthesis process is disclosed and described, it is to be understood that this invention is not limited to the particular process steps and materials disclosed herein as such process steps and materials may vary to some degree. It is also to be understood that the terminology used herein is used for the purpose of describing particular embodiments only and is not intended to be limiting as the scope of the present invention will be limited only by the appended claims and equivalents thereof.

It must be noted that, as used in this specification and the appended claims, singular forms of "a," "an," and "the" include plural referents unless the content clearly dictates otherwise.

"Single pot" means that both phases of the reaction can be carried out in a single reaction container. The product of the molten phase reaction is a liquid which may immediately be carried on to the next step of the reaction without additional unit operations, e.g., filtration, new reactors, centrifugation, etc.

"Linear phosphazene polymers" are polymers having alternating double and single covalent bonds between phosphorous and nitrogen and having two additional groups also covalently bonded to the phosphorus. The structure can be depicted generically as $[-R_2P=N-]_n$. If R is chlorine, then the polymer is poly(dichlorophosphazene).

"Solid state reaction" and "melt phase reaction" are used interchangeably to mean the reaction of the present invention whereby a solution such as chlorinated hydrocarbon solvents are not required to carry out the reaction. The reaction begins as solid raw materials are admixed and heated without the presence of a solvent.

"Phase I" or "first phase" refers to the combining of the raw materials in solid state and heating to form the liquid monomer.

"Phase II" or "second phase" refers to the second reaction that occurs as a compound is distilled off as a byproduct under nitrogen atmospheric conditions and heat.

With this in mind and without unduly narrowing limitations, the present invention is directed toward a method of preparing a poly(dichlorophosphazene) through a condensation reaction that is markedly better than condensation reactions of the prior art. Notably, changes to the prior art eliminate the use of chlorinated hydrocarbon solvents, the elimination of complicated equipment and simplification of the overall process by providing a "single pot" two step reaction sequence that permits a practitioner to more carefully control the reaction conditions resulting in greater molecular weight and polydispersity controls.

Essentially, the present invention is drawn toward a method of preparing poly(dichlorophosphazene) comprising the steps of: 1) combining ammonium sulfate (($NH_4$)$_2SO_4$) with phosphorus pentachloride ($PCl_5$) in a reaction container; 2) heating the combined ammonium sulfate (($NH_4$)$_2SO_4$) and phosphorus pentachloride ($PCl_5$) until a liquid monomer of P-trichloro-N-(dichlorophosphoryl)monophosphazene ($Cl_3P$=$NP(O)Cl_2$) is formed; and 3) bulk polymerizing the P-trichloro-N-(dichlorophosphoryl)monophosphazene ($Cl_3P$=$NP(O)Cl_2$) liquid monomer by heating under an inert atmosphere (such as nitrogen, argon, etc.) until an oxyphosphoryl trichloride is distilled off forming a polydichlorophosphazene ($[Cl_2P$=$N]_n$) in the container. Steps 1 and 2 describe Phase I and step 3 describes Phase II as defined.

Specifically, the newly developed solid state reaction process features, in Phase I, a solid melt reaction of the starting materials, i.e., ammonium sulfate (($NH_4$)$_2SO_4$) and phosphorus pentachloride ($PCl_5$), which are combined in effective proportions and heated to produce a liquid monomer of P-trichloro-N-(dichlorophosphoryl)monophosphazene ($Cl_3P$=$NP(O)Cl_2$). This step (Phase I) is depicted as follows:

9$PCl_5$+2($NH_4$)$_2SO_4$→2$Cl_3P$=$NP(O)Cl_2$+oligomers+gases+$POCl_3$

In carrying out Phase I of the reaction, the ($NH_4$)$_2SO_4$ to $PCl_5$ molar ratio should be about 2:9.

The liquid product is then bulk polymerized by heating the liquid monomer as oxyphosphoryl trichloride is distilled off under an inert nitrogen atmosphere leaving poly(dichlorophosphazene) behind. This step (Phase II) is depicted as follows:

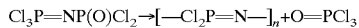

$Cl_3P$=$NP(O)Cl_2$→[—$Cl_2P$=$N$—]$_n$+O=$PCl_3$

Regarding Phase I of the reaction, ammonium sulfate (($NH_4$)$_2SO_4$) and phosphorus pentachloride ($PCl_5$) must be heated at temperatures from about 150 to 180° C. in order for the reaction to occur properly resulting in a P-trichloro-N-(dichlorophosphoryl)monophosphazene ($Cl_3P$=$NP(O)Cl_2$) liquid monomer. However, a preferred temperature is about 165° C. Additionally, this step requires a sufficient amount of time for the reaction to produce desirable amounts of P-trichloro-N-(dichlorophosphoryl)monophosphazene ($Cl_3P$=$NP(O)Cl_2$). Therefore, the raw ingredients must be heated for about 5 to 300 minutes. However, about 20 minutes is a preferred amount of time for the reaction to occur.

Regarding Phase II of the reaction, the P-trichloro-N-(dichlorophosphoryl)monophosphazene ($Cl_3P$=$NP(O)Cl_2$) liquid monomer is heated under inert (dry nitrogen or argon) atmosphere conditions until oxyphosphoryl trichloride is distilled off. This is accomplished as the liquid monomer is heated to temperatures from about 200 to 300° C. However, a preferred temperature is about 225° C. Additionally, the heating process requires from about 2 to 500 minutes, but about 60 minutes is a preferred amount of time for the distillation to occur.

The process of the present invention produces a linear poly(dichlorophosphazene) of about 10,000 to 2,500,000 daltons without significant cross linking. This is significant because poly(dichlorophosphazene) is a commonly used starting material to prepare other phosphazenepolymers including poly(organophosphazenes). In fact, phosphazene polymers may also then be utilized to form useful structures such as separation membranes, polymer electrolytes, denture liners and fertilizers.

There are several advantages to following the process of making polyphosphazenes in a molten phase (or solid phase) reaction described in the present invention as compared to previously known reactions performed in solution. First, the rate of reaction is significantly greater in the molten phase process of the present invention. For example, for a 1 Kg sized reaction having the reaction container immersed in a 170° C. oil bath, the molten state reaction is completed in about 20 minutes whereas the solution phased reaction requires a minimum of 50 minutes. Second, heating for longer periods of time than required by the reaction, i.e., more than 20 minutes for the molten phase reaction or more than 50 minutes by the solution phased reaction in the previous example, is less of a factor with the molten phase reaction than the solution phased reaction. In fact, heating for longer periods of time than required in the molten phase reaction does not lead to significant changes in product distributions. However, with solution phased reactions of the prior art, the end time is crucial to avoid additional side product formation. This being the case, the end time of the molten phase reaction need not be rigorously monitored. Third, the product of the molten phase reaction is a liquid which may immediately be carried on to the next step of the reaction without additional unit operations, e.g., filtration, new reactors, centrifugation, etc. With these advantages in mind, some aspects of the molten phase reaction are unchanged when compared to the solution phase reaction of the prior art including, but not limited to, similar buildup and decay patterns of both products and intermediates. Finally, regarding Phase II of the reaction, there are also characterizations that may be considered improvements over the prior art. For example, polymerization of the liquid monomer in the bulk phase proceeds more cleanly at a lower temperature than by those processes previously reported.

The following example illustrates one preferred method of preparing poly(dichlorophosphazene). This example should not be considered as limitations of the present invention, but merely one embodiment to teach how to make the best known poly(dichlorophosphazenes) based upon current experimental data.

EXAMPLE

Under a dry nitrogen atmosphere 100 g (0.48 mol, 4.5 equivalents) $PCl_5$ powder was mixed with 14.12 g (0.107 mol) ($NH_4$)$_2SO_4$ in a one liter round bottomed flask equipped with a spin bar, a gas inlet and a reflux condenser (all joints were 24/40). The reflux condenser was equipped with Tygon tubing which was immersed in a water bubbler at the other end. Under nitrogen atmosphere, the reaction vessel was placed in an oil bath pre-heated to 165° C. at which point the powder mixture began liquefying the nitrogen gas inlet was shut off. This occurred concurrently with intense gas evolution as evidenced from the intense bubbling in the water bubbler. Within 20 minutes, all of the solid reactants liquefied signaling the completion of phase I of the overall polymerization reaction (as confirmed by $^{31}$P NMR spectroscopy) then the water bubbler was disconnected and the dry nitrogen atmosphere re-established. The condenser was then replaced with a simple distillation head and temperature was raised gradually to 225° C. The pale yellow liquid product was stirred at this temperature for one hour, during which time phosphorus oxychloride liquid distilled over into a 100 ml Schlenk flask leaving behind a very viscous, virtually colorless, liquid. The viscous liquid is the polycondensate product of polydichlorophosphazene, i.e. [—$Cl_2$P=N—]$_n$, as was confirmed by $^{31}$P NMR. The polymer yield was 24.78 g (100% of theoretical) based on $(NH_4)_2SO_4$.

While the invention has been described with reference to certain preferred embodiments, those skilled in the art will appreciate that various modifications, changes, omissions and substitutions can be made without departing from the spirit of the invention. It is intended, therefore, that the invention be limited only by the scope of the following claims.

We claim:

1. A solid state method of preparing poly(dichlorophosphazene) comprising the steps of:

combining, in a solid state and without the presence of a solvent, ammonium sulfate $((NH_4)_2SO_4)$ with phosphorus pentachloride $(PCl_5)$ in a reaction container;

heating said combined ammonium sulfate $((NH_4)_2SO_4)$ and phosphorus pentachloride $(PCl_5)$ until a liquid monomer of P-trichloro-N-(dichlorophosphoryl) monophosphazene $(Cl_3P=NP(O)Cl_2)$ is formed; and bulk polymerizing said P-trichloro-N-(dichlorophosphoryl)monophosphazene $(Cl_3P=NP(O)Cl_2)$ liquid monomer by heating under an inert nitrogen atmosphere until an oxyphosphoryl trichloride is distilled off forming a polydichlorophosphazene $([Cl_2P=N]_n)$ in said container.

2. A method of preparing poly(dichlorophosphazene) as in claim 1 wherein said ammonium sulfate $((NH_4)_2SO_4)$ and said phosphorus pentachloride $(PCl_5)$ are combined in a molar ratio of about 2:9.

3. A method of preparing poly(dichlorophosphazene) as in claim 1 wherein said combined ammonium sulfate $((NH_4)_2SO_4)$ and phosphorus pentachloride $(PCl_5)$ are heated at a temperature from about 150 to 280° C.

4. A method of preparing poly(dichlorophosphazene) as in claim 3 wherein said combined ammonium sulfate $((NH_4)_2SO_4)$ and phosphorus pentachloride $(PCl_5)$ are heated at about 165° C.

5. A method of preparing poly(dichlorophosphazene) as in claim 3 wherein said combined ammonium sulfate $((NH_4)_2SO_4)$ and phosphorus pentachloride $(PCl_5)$ are heated for about 50 to 300 minutes.

6. A method of preparing poly(dichlorophosphazene) as in claim 5 wherein said combined ammonium sulfate $((NH_4)_2SO_4)$ and phosphorus pentachloride $(PCl_5)$ are heated for about 20 minutes at the single kilogram scale.

7. A method of preparing poly(dichlorophosphazene) as in claim 1 wherein said liquid monomer $(Cl_3P=NP(O)Cl_2)$ under said nitrogen atmosphere is heated at a temperature from about 200 to 300° C.

8. A method of preparing poly(dichlorophosphazene) as in claim 7 wherein said liquid monomer $(Cl_3P=NP(O)Cl_2)$ under said nitrogen atmosphere is heated at about 225° C.

9. A method of preparing poly(dichlorophosphazene) as in claim 7 wherein said liquid monomer $(Cl_3P=NP(O)Cl_2)$ under said nitrogen atmosphere is heated for about 2 to 500 minutes at 1 kilogram scale.

10. A method of preparing poly(dichlorophosphazene) as in claim 9 wherein said liquid monomer $(Cl_3P=NP(O)Cl_2)$ under said nitrogen atmosphere is heated for about 60 minutes.

11. A method of preparing poly(dichlorophosphazene) as in claim 2 wherein said step of bulk polymerizing produces said poly(dichlorophosphazene) at from 10,000 to 2,500,000 daltons, and polydispersity indeces of 1.5–12.

12. A method of preparing poly(dichlorophosphazene) as in claim 11 wherein said poly(dichlorophosphazene) is reacted with an organic or organometallic nucleophile to prepare a (poly)organophosphazene polymer.

* * * * *